US010257916B1

(12) United States Patent
Wein (10) Patent No.: US 10,257,916 B1
(45) Date of Patent: Apr. 9, 2019

(54) WEARABLE ACCESSORY WITH LIGHTING EFFECT

(71) Applicant: Michael Wein, Houston, TX (US)

(72) Inventor: Michael Wein, Houston, TX (US)

( * ) Notice: Subject to any disclaimer, the term of this patent is extended or adjusted under 35 U.S.C. 154(b) by 0 days.

(21) Appl. No.: 15/890,176

(22) Filed: Feb. 6, 2018

Related U.S. Application Data (63) Continuation-in-part of application No. 15/296,032, filed on Oct. 17, 2016, now Pat. No. 9,888,550, which is a continuation of application No. 14/797,034, filed on Jul. 10, 2015, now Pat. No. 9,474,137, which is a continuation-in-part of application No. 14/250,074, filed on Apr. 10, 2014, now Pat. No. 9,109,763, which is a continuation of application No. 13/366,243, filed on Feb. 3, 2012, now Pat. No. 9,111,184, which is a continuation-in-part of application No. PCT/US2010/043839, filed on Jul. 30, 2010, which is a continuation of application No. 12/534,813, filed on Aug. 3, 2009, now Pat. No. 8,006,899.

(51) Int. Cl.
| | |
|---|---|
| *H05B 37/02* | (2006.01) |
| *G06Q 20/04* | (2012.01) |
| *G06Q 20/20* | (2012.01) |
| *G06K 19/07* | (2006.01) |
| *G06Q 20/32* | (2012.01) |
| *G06Q 20/40* | (2012.01) |
| *G06Q 20/10* | (2012.01) |
| *G09F 3/00* | (2006.01) |
| *G09F 27/00* | (2006.01) |
| *G09F 21/02* | (2006.01) |
| *A63H 37/00* | (2006.01) |
| *G06K 19/04* | (2006.01) |
| *G06K 19/077* | (2006.01) |

(52) U.S. Cl.
CPC .......... *H05B 37/029* (2013.01); *A63H 37/00* (2013.01); *G06K 19/04* (2013.01); *G06K 19/0702* (2013.01); *G06K 19/0707* (2013.01); *G06K 19/0717* (2013.01); *G06K 19/07705* (2013.01); *G06K 19/07758* (2013.01); *G06K 19/07762* (2013.01); *G06Q 20/10* (2013.01); *G06Q 20/3278* (2013.01); *G06Q 20/401* (2013.01); *G09F 3/005* (2013.01); *G09F 3/0297* (2013.01); *G09F 21/02* (2013.01); *G09F 27/00* (2013.01); *G09F 27/005* (2013.01); *H05B 37/0272* (2013.01)

(58) Field of Classification Search
None
See application file for complete search history.

(56) References Cited

U.S. PATENT DOCUMENTS

| 7,011,435 B1 | 3/2006 | Blaymore |
|---|---|---|
| 7,614,771 B2 | 11/2009 | McKechnie |

(Continued)

*Primary Examiner* — Dedei K Hammond
(74) *Attorney, Agent, or Firm* — Rao DeBoer Osterrieder, PLLC; Dileep P. Rao (57) ABSTRACT

A plurality of wearable accessories for creating a synchronously presented lighting effect from an audience in a controlled access venue. Each accessory has a substrate, a power source, at least one light, a controller, and a radio frequency identification (RFID) tag. The radio frequency identification tag can store information and communicate with other devices to enable a user to conduct transactions with others.

10 Claims, 5 Drawing Sheets

(56) References Cited

U.S. PATENT DOCUMENTS

| | | | |
|---|---|---|---|
| 2011/0058363 A1 | 3/2011 | Fattizzi | |
| 2012/0253974 A1* | 10/2012 | Haikonen | G06Q 20/29 705/26.41 |
| 2014/0184386 A1* | 7/2014 | Regler | G08B 5/228 340/7.61 |

* cited by examiner

WEARABLE ACCESSORY WITH LIGHTING EFFECT

CROSS REFERENCE TO RELATED APPLICATIONS

The present application is a Continuation in Part of U.S. patent application Ser. No. 15/296,032, filed on Oct. 17, 2016, titled "WEARABLE ACCESSORY WITH LIGHTING EFFECT," which issued as U.S. Pat. No. 9,888,550, which is a Continuation of U.S. patent application Ser. No. 14/797,034 filed on Jul. 10, 2015, titled "SUBSTRATE WITH LIGHTING EFFECT," which issued as U.S. Pat. No. 9,474,137, which is a Continuation in Part of U.S. patent application Ser. No. 14/250,074 filed on Apr. 10, 2014, titled "ENTRANCE TICKET WITH LIGHTING EFFECT," which issued as U.S. Pat. No. 9,109,763, which is a Continuation of U.S. patent application Ser. No. 13/366,243 filed on Feb. 3, 2012, titled "ENTRANCE TICKET WITH LIGHTING EFFECT," which issued as U.S. Pat. No. 9,111,184, which is a Continuation in Part of International Application Serial No. PCT/US2010/043839 filed on Jul. 30, 2010, titled "ENTRANCE TICKET WITH LIGHTING EFFECT," which is a Continuation of U.S. patent application Ser. No. 12/534,813 filed on Aug. 3, 2009, titled "ENTRANCE TICKET WITH LIGHTING EFFECT," which issued as U.S. Pat. No. 8,006,899. These references are hereby incorporated in their entirety.

FIELD

The present embodiments generally relate to a plurality of wearable accessories and a method of using a plurality of wearable accessories to provide admission to a controlled access venue and to create a lighting effect synchronized with other audience members, enabling the holder to gain admission to the venue and to participate with a performance at the venue and initiate payments at the venue.

BACKGROUND

A need exists for a plurality of wearable accessories that can provide for tracking of admissions, controlling access of admissions, as well as enabling each wearer to interact with a performance at a controlled access venue, thereby enabling the wearer to more fully become involved in a performance. Further, a need exists for a plurality of wearable accessories which enable users to pay for purchases using information stored by the accessories.

The present embodiments meet these needs.

BRIEF DESCRIPTION OF THE DRAWINGS

The detailed description will be better understood in conjunction with the accompanying drawings as follows.

The embodiments of the present disclosure are detailed below with reference to the listed Figures.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The embodiments of the present disclosure generally relate to wearable accessories for creating a synchronously presented lighting effect that is usable with a controlled access venue which further is capable of providing payment for transactions and purchases at the venue.

The embodiments can use a plurality of accessories at a venue for creating a lighting effect, while allowing the user of each individual accessory to initiate and/or receive payments using wireless communications.

The accessories can create a synchronously presented lighting effect from an audience in a controlled access venue, such as a music theater or a concert hall, during a performance.

Each of the plurality of accessories can have a substrate with a first side for supporting a readable identification code and a second side for supporting an advertising or other message, such as "don't smoke" or "danger high decibels expected." The substrate can have a thickness less than about 0.4 inches, can weigh less than about 2 ounces, and can be flexible.

The identification code can be a bar code, a numerical code, an alphanumeric code, a radio frequency identification "RFID" tag, or a series of "check digits" used to verify a code, which are known in the warehouse packing industry.

A power source can be disposed on, proximate to, or embedded within the substrate. An exemplary power source can be from about 1 volt to about 9 volts and can originate from a battery such as a hearing aid battery, a printable battery, a watch battery, a lithium ion battery, a rechargeable battery, a solar battery, or any other commercially available battery. Any power source known to persons having ordinary skill in the art can be used.

At least one light can be electrically connected to the power source for use during the performance. In embodiments, the light can be a light emitting diode "LED".

A controller with a processor, and a data storage can be disposed in the substrate. The processor can be in communication with the data storage and can further be in electrical communication with the power source, the at least one light, and the RFID tag.

Computer instructions can be stored in the data storage, which can be used to instruct the processor to operate the lights in a predetermined sequence. The processor can be activated by a musical beat, by a melody, by a pitch line, or the processor can activate as a reaction to the performance on the stage of the controlled access venue. The data storage can be flash memory. The processor can be microprocessor.

The accessory can have an actuator associated with the substrate which can be, in an embodiment, embedded in the substrate for initiating flashing of the lights based on a predetermined set of computer instructions which determine how the lights flash, including the sequence of the flashing.

The actuator can be in direct communication with the processor. The actuator can be a sound receiver that can receive a sound from the stage or a signal from a performance transmitter and can then initiate the lighting effect. The signal from the performance transmitter can be referred to herein as a first signal.

The sound receiver can be a microphone or any other commercially available sound receiver.

The accessory can have an actuator that is a pull tab, which can be disposed at least partially in the substrate acting as a separator between the power source and the processor, so that when the pull tab is removed a connection between the processor and the power source is formed such that the processor can receive power and can utilize the computer instructions on the data storage which determines the sequence of the lighting effect.

In operation, the pull tab can be torn off the substrate, thereby establishing a circuit between the power source and the processor and sending a signal to initiate the processor. The pull tab can initially be disposed between the power source and the processor, thereby disrupting any electronic signal from communicating between the power source and the processor. Upon removal of the pull tab from the substrate, the pull tab will no longer be disrupting any electronic signal between the power source and processor, allowing the processor to be initiated.

In embodiments, the pull tab can be disposed on a tear tab, such as a perforated ticket stub. The tear tab can be removed from the ticket or substrate by tearing the tear tab from the ticket or substrate along the perforation. As the tear tab is removed from the substrate, the pull tab is simultaneously removed from the substrate, thereby establishing electrical communication between the power source and the processor. In this manner, the tear tab cannot be reattached to the substrate, thereby ensuring that the ticket is only usable for one performance.

In an embodiment, the actuator can initiate the processor when it receives a second signal from a network transmitter connected to a network to start the lighting sequence or to change a lighting sequence that has been started.

Alternatively, a switch, such as an electronic on/off switch, can be embedded in the substrate or attached to the surface of the substrate. The switch can mechanically initiate the light individually or can initiate the flashing light sequence.

Combinations of actuators can be usable in an embodiment of the wearable accessory or the ticket.

The processor of each accessory can operate synchronously to create a lighting effect, such as three short flashing lights, followed by two long flashing lights, followed by three short light flashes to interact and send a message with music being performed on stage. Another part of the same audience can have different computer instructions, which flash those lights in a counterpoint beat to the first group of audience members. Similarly, there can be a third group of audience members, which can be all with green lights, that flash as a group in between the other flashing lights which can be red or blue. Additional colors or multicolored lights can be useable with the embodiments.

In embodiments, the processors for each of the plurality of accessories can synchronously and/or simultaneously operate during a performance all the while serving the dual purpose of controlling access to the controlled access venue. These unique tickets or wearable accessory can allow each holder to interactively participate with the performance as a member of the performance with the ticket.

The accessories can have a flexible substrate, which can be reusable. In an embodiment, the flexible substrate can have a thickness of less than about 1 inch, and a weight of less than about 5 ounces.

The first signal can be an audio signal or a wireless signal. In an embodiment, the audio signal can have a preset frequency limit that represents a bass frequency range, a treble frequency range, a sequence of pitches, or a drum beat sequence to initiate the actuator on each of the plurality of tickets.

For various embodiments, the audio signal and the wireless signal can come from the network, which can be initiated at a predetermined time.

In embodiments, the audio signal and the wireless signal can be generated by a user, such as by a disc jockey "DJ", an operator, a sound technician, or similar user, by tapping a beat using a mouse, an IPOD™., an IPHONE™, or another similar device, which can be in communication with the network, such as with a computer, a laptop, a personal digital assistant, a smart phone, a cellular phone, or combinations thereof.

The ticket can additionally have an expiration date programmed into the computer instructions in the data storage for deactivating the processor, so that a ticket used for a concert in New Jersey, on Jun. 22, 2009 cannot be used again to see a concert in Chicago on Jun. 23, 2009.

It is contemplated that the light can be a light emitting diode (LED), a fluorescent light, a halogen light, a neon light, or combinations thereof.

In embodiments, an electroluminescence coating can be printed on the substrate and can also act as the lighting effect, replacing the light for some uses, and acting in conjunction to the light in other uses. In addition, electroluminescent wire can be used, which can also act as the lighting effect.

If lights are used, the lights can be connected together on the accessory in series, in parallel, or combinations thereof, to the power source.

The substrate can also include a lighter and, for various embodiments, the actuator can be a removable pin removable from the lighter to allow the sequence of lights to electrically engage the power source and initiate.

The lighter can have a case, which can be 100 percent engulfed with electroluminescence, electroluminescent wires, chemi-luminescent paint, or a similar coating that appears to glow independently without the need for any additional stimulating light. Embodiments can use black lights.

In embodiments, the ticket can be imprinted and a "smart" lighter with a removable pin for engaging the lighter, such as a magnet pin that can be detachable at the venue with a security controllable pin removing device.

In embodiments, the lighter can also include a microprocessor and data storage, which can also have computer instructions for producing a lighting effect as described previously.

In other embodiments, the removable pin can only be removable by a security guard, and the removable pin can in fact be a security controllable pin that can require a security controllable pin removing device that is only used by authorized personnel at the controlled access venue.

The substrate of the apparatus can be contemplated to be one or more of the following types of items for various embodiments: a stiff paper, a non-forming flexible but crystalline plastic, a cardboard sheet, a thin aluminum plate, a flexible metal plate, a rubberized plate or a 2-millimeter thin plate of another flexible but shape supporting synthetic material.

The power source can be a AAA DC battery, a AA battery, a lithium ion battery, a solar cell, a watch battery, a hearing aid battery, or any other commercially available battery. The power source can be rechargeable for various embodiments. The power source can be replaceable for various embodiments.

The power source can be a printable battery, such as one from the Fraunhofer Research Institution for Electronic Nano Systems ENAS, of Germany. This embodiment is environmentally friendly, as the printable battery contains little to no mercury.

The apparatus can include a substrate that can operate as a wrist band, a neck band, head gear, a neck lanyard, a brooch, a T-shirt, sunglasses, or another wearable ticket with a lighting effect.

In embodiments, the apparatus can have a "no reentry" code, which can prohibit reentry of apparatus to the controlled access venue.

In order to more fully understand the accessory, an embodiment of a method of using the apparatus can include the steps of:

(a) gaining access to a controlled access venue using a wearable accessory with a substrate, with an actuator embedded within the substrate, wherein the actuator is connected to a power source embedded in the substrate, at least one light embedded in the substrate, a controller with a processor embedded in the substrate, data storage communicating with the processor embedded in the substrate, computer instructions in the data storage for instructing the processor to operate at least one light;

(b) actuating at least one light on the ticket comprising a step selected from the group consisting of: pulling on a pull tab; receiving a first signal from a performance transmitter; tearing off a tear tab disposed on the substrate, wherein a pull tab is disposed on the tear tab; engaging a switch embedded in the substrate; receiving a second signal from a network transmitter connected to a network; actuating a switch disposed on the substrate; and receiving a first signal from a performance venue;

(c) receiving a second signal from a network to synchronously operate each of the least one lights to create a synchronous lighting effect with each processor of each ticket in an audience, while controlling access to the controlled access venue, allowing each member of the audience to interactively participate with a performance; and (d) allowing the wearer of the accessory to initiate and/or receive payment via communication through an RFID tag.

In embodiments, the plurality of portable collaborative lighting devices each can have a passive RFID tag or an active RFID tag which can be used to automatically identify and capture data about a venue, about paying for a ticket, and about the wearer of the plurality of portable collaborative lighting devices.

In embodiments, individuals can upload personal identification information onto an RFID tag attached or embedded in the plurality of portable collaborative lighting devices, which enables the individual user to notify a drink counter automatically that the wearer is over/under age to acquire the drink.

The term "RFID tag" can refer to any equivalent structure such as a near field communication chip, BLUETOOTH™, WIFI transmitter, or other communication mechanism known to persons having ordinary skill in the art. With RFID tags, individuals can upload bank or credit card data onto the RFID tag so that each of the plurality of portable collaborative lighting devices can be used to make purchases at the venue, such as to pay for food at the venue.

The RFID tag can be utilized for storing identifying information, payment information, access rights at the venue, and the like. An activation mechanism for payment can be incorporated into each of the plurality of wearable accessories. Various biometric mechanisms, such as fingerprint readers, face recognition, or iris scanners can be incorporated, as well as requiring the input of a pin code.

The processor of each wearable accessory can be instructed to perform various transactions with the use of the RFID tag and information store thereon. Using information, such as bank account information, credit card information, specially established accounts for the venue, gift cards, and the like, the wearable accessory can be utilized to initiate and/or receive payment. Various methods of electronic payment are known to persons having ordinary skill in the art and any appropriate mechanism can be implemented.

For example, Betsy gets her wearable accessory as a wristband in the mail ahead of an event. By simply taking the unique code associated with this wristband, she can upload payment data for use with the wristband using any of the following exemplary methods: a website, an app, or through a call center.

Depending upon which method she selects, she can get the ability to initiate and/or receive payments via her wristband by, for example, uploading debit/credit card info directly (photo/scan or manual entry) or by connecting her wristband to a third-party payment platform such as APPLE-PAY™ or PAYPAL™. Single step device activation is possible by registration with social integration or social media sites.

After uploading payment info, her identity can be confirmed by scanning her photo ID with her phone. This means that she is automatically age qualified for purchases such as alcohol, etc. Because the device can have location and proximity sensors, Betsy can be enjoying a show at a festival without having to go to the concession stand and leave the blanket she and her friends have spread out on the grass, she can place an order for a cold beer on her phone, verify her identity/age, pay for it in real time using the payment data attached to her wristband's RFID sensor and then have the beverage delivered via drone to her exact location (identified via the location and/or proximity sensors embedded in the wristband).

After Betsy places an order, the concert can accept payment and deliver goods. If Betsy is ordering at the concession stand, she can simply wave her wristband in front of the proximity sensor to verify payment. Because her ID is also scanned, her age verification pops up along with a photo image that can be confirmed by the concession attendant. There are various encrypted ways that payment can be taken, including the use of many smart device mobile scanners.

In other embodiments, a wearer can obtain the plurality of portable collaborative lighting devices at the door of the venue in the form of ear buds, a hat, a T-shirt, a foam stick, a towel, a neck land yard. The RFID tag embodiment enables individuals at the venue to order food and/or drinks via their phone and have the items delivered based on an active RFID tag transmitting the location of the wearer, such as a GPS location at the venue. In embodiments, the RFID tag, whether active or passive, can be configured to transfer money units to other portable collaborative lighting device, such as wristbands using encryption technology. Credit card information can be uploaded into the RFID tag enabling the RFID tag to act as a credit card. In another embodiment, the RFID tag can hold money, like a debit card with a pin code.

The RFID tag can hold credits from a venue, instead of actual cash. For example, a parent at the venue can have a first portable collaborative lighting device and a child at the same venue can have a second portable collaborative lighting device, computer instructions in the portable collaborative lighting devices can enable the first user or parent to provide money credits to the second user, or child.

In embodiments, each of the plurality of portable collaborative lighting devices can be any device that completes a circuit, and when the circuit is disconnected, all financial information and confidential information can be automatically erased. In embodiments, the RFID tag, whether active or passive can be used to confirm the wearer identity at a security gate and allow entrance by the wearer into restricted areas, such as a Hotel room, a VIP section, or a back-stage area, based on a priority code embedded in the RFID tag.

Figure 1A:
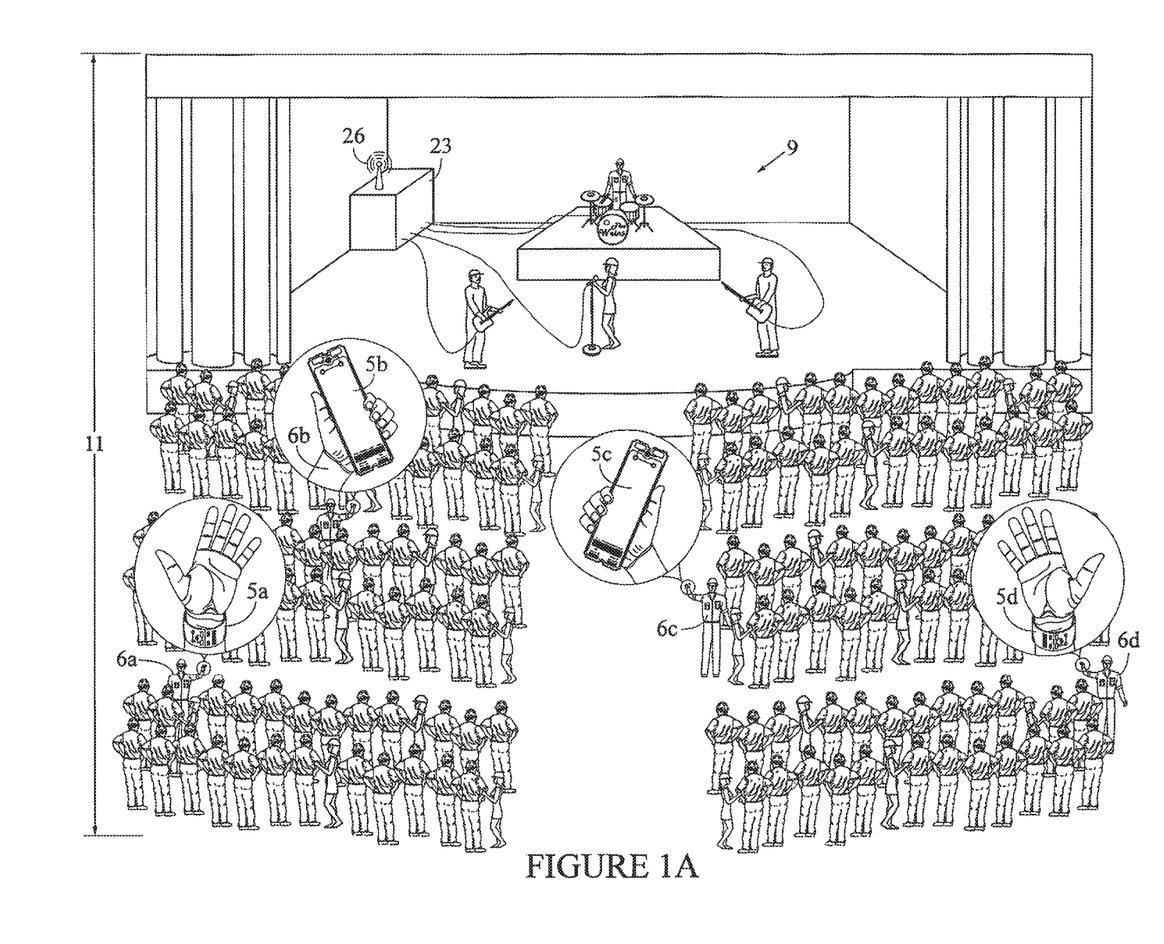
FIG. 1A shows a diagram of a controlled access venue with the wearable accessories for the lighting effect contained in it.

Turning now to the Figures, FIG. 1A shows a controlled access venue 11 with a plurality of wearable accessories, 5a, 5b, 5c, 5d. Each wearable accessory can be held by a member of the audience 6a, 6b, 6c, 6d. The performance 9 can occur on a stage in front of the audience or can be viewable by the audience. The performance can be remote or can be electronically connected to the audience in the manner of live aid concerts, which can have remote audiences to a show going on in London.

Also shown in FIG. 1A is a transmitter 23 for transmitting a first signal 26.

Figure 1B:
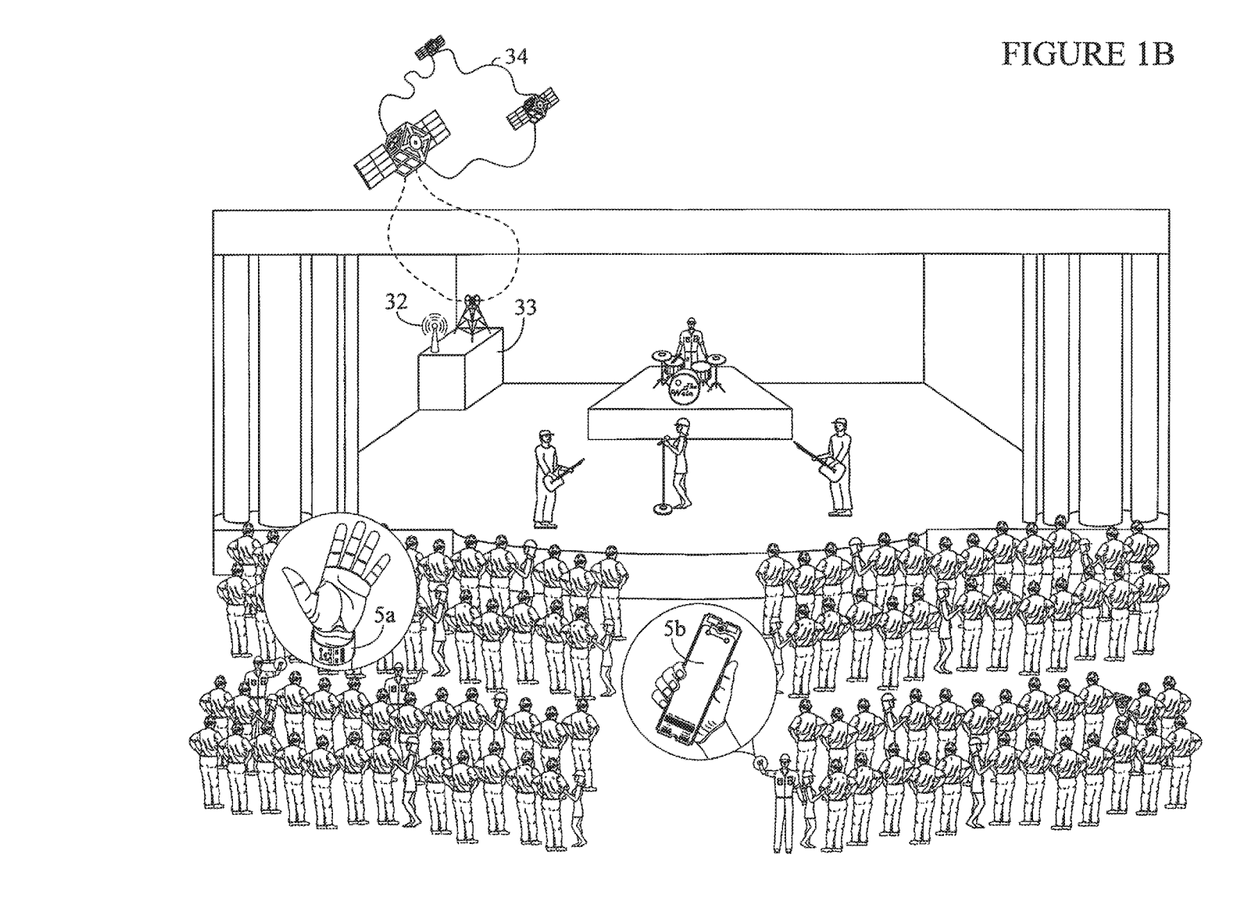
FIG. 1B shows an alternative embodiment of a diagram of a controlled access venue with the wearable accessories for the lighting effect contained in it.

FIG. 1B shows an alternative embodiment of FIG. 1A, with a network 34 in communication with a network transmitter 33 for transmitting a second signal 32 to the plurality of tickets 5a, 5b, 5c, 5d.

Figure 2:
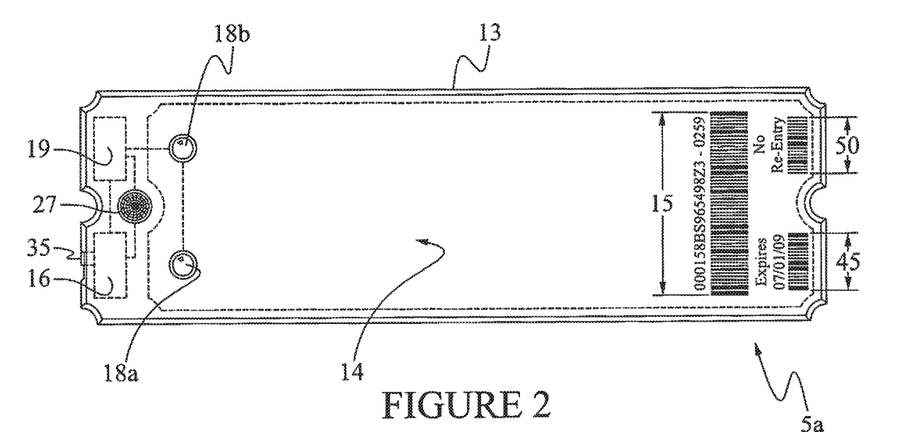
FIG. 2 shows an embodiment of a front view of the wearable accessory.

FIG. 2 shows a front view of a wearable accessory 5a. The wearable accessory can have a substrate 13, which can be flexible and can be made of a plastic. In embodiments, the plastic can be clear and transparent. The plastic can also be a crystalline polypropylene or homopolymer of polyethylene that can withstand temperatures up to about 112 Fahrenheit without deforming or melting.

The substrate 13 can have a first side 14, which can have a non-removable readable identification code 15. The identification code can be intended to not only be readable by a scanner, such as a bar code, but can be readable or scanned by a human.

In the substrate 13 can have a power source 16 that can be battery. Also, in the first side 14 can be a first light 18a and a second light 18b, which can be the same color, different colors, or multicolored. The lights can be connected to the power source/RFID tag 16.

A controller 19 can also be connected to at least one light 18a, 18b, which can be connected in series, in parallel, or combinations thereof. The controller 19 can be in communication with the power source 16.

FIG. 2 also shows the sound receiver 27 which is depicted connected to the power supply 16 and the controller 19. The sound receiver 27 can be a wireless signal receiver, or an infrared detector, which the first signal can be transmitted to via the network.

The wearable accessory is shown with a switch 35 for actuating the lighting effect using the lights. The wearable accessory can also have an expiration date 45 and a no reentry code 50.

Figure 3:
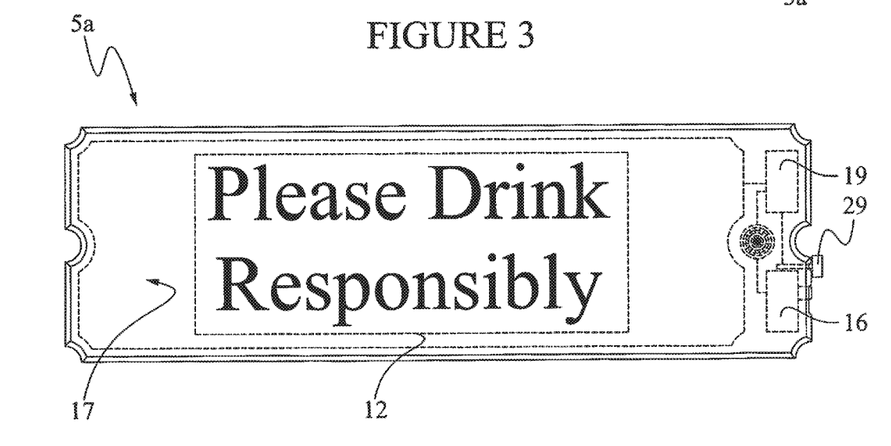
FIG. 3 shows an embodiment of a back view of the wearable accessory.

FIG. 3 shows the opposite side of an embodiment of the wearable accessory 5a of FIG. 2 with the second side 17 supporting a message 12. This Figure also shows the pull tab 29, which is disposed as a block between the controller 19 and the power source/RFID tag 16. In this embodiment, once the pull tab is pulled or torn, it will remove the block from the power source to the controller and initiate the lighting effect.

Figure 4:
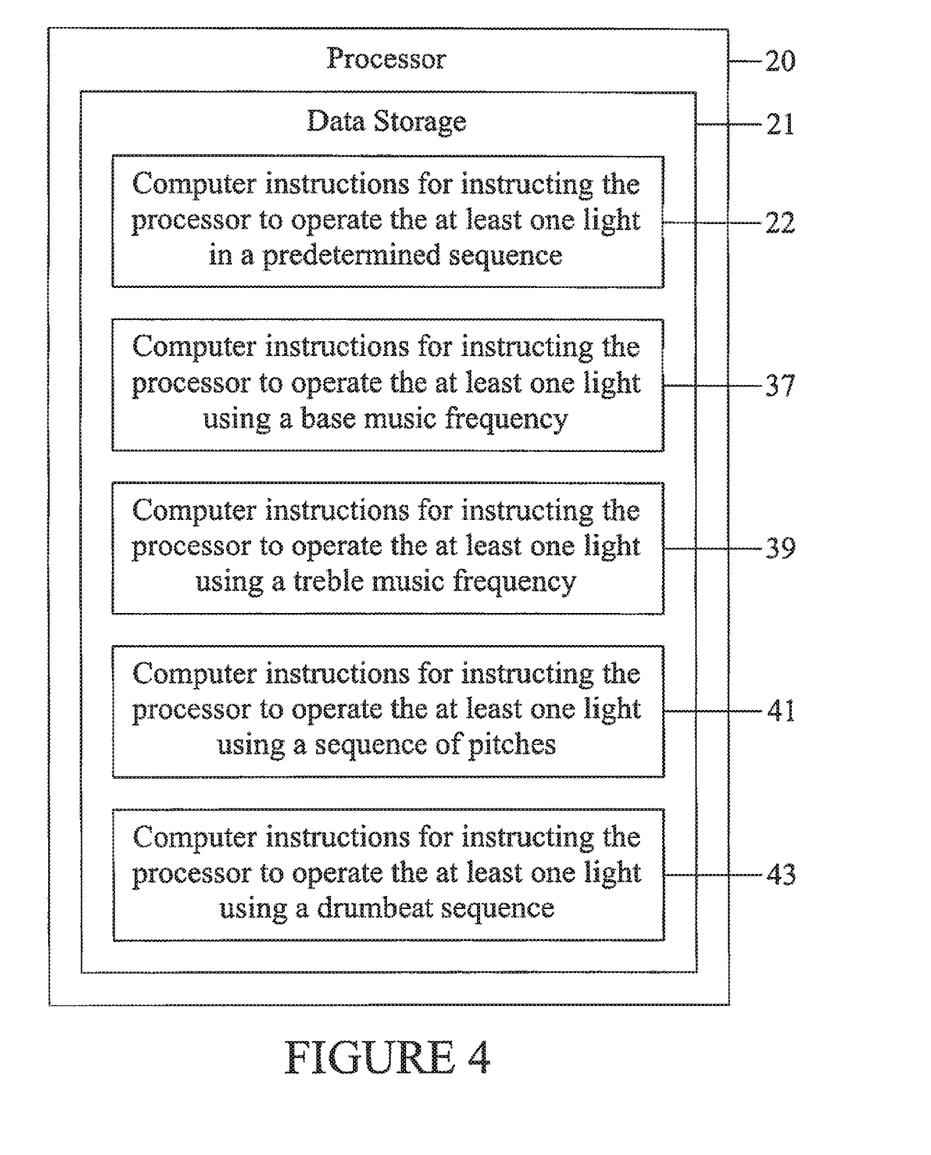
FIG. 4 is a diagram of the processor with computer instructions in data storage.

FIG. 4 shows a processor 20 with data storage 2, which can further have computer instructions 22, which can include computer instructions to instruct the processor to operate the at least one light using a predetermined sequence 22, a bass music frequency 37, a treble music frequency 39, a sequence of pitches 41 or a drumbeat sequence 43.

In embodiments, lighting effect can be pulsed based on the beat or tempo of the music. The lights can be individually preprogrammed lights with flashing sequences. The lights can be operated based on a seat location and can be based on the audio sequence of the performance.

In an embodiment, certain lights on certain tickets can operate based on the performer, such as group A can operate during the drumbeat sequence, provided by a drummer of the performance, and group B can operate during the bass music frequency, provided by a bassist of the performance.

The lights can change in intensity, color, pulsation, on/off signaling based on the mood of the music, the tempo of the music and the dynamic of the music.

The colors of the lights can further be operated based on sponsorships of the venue.

Figure 5:
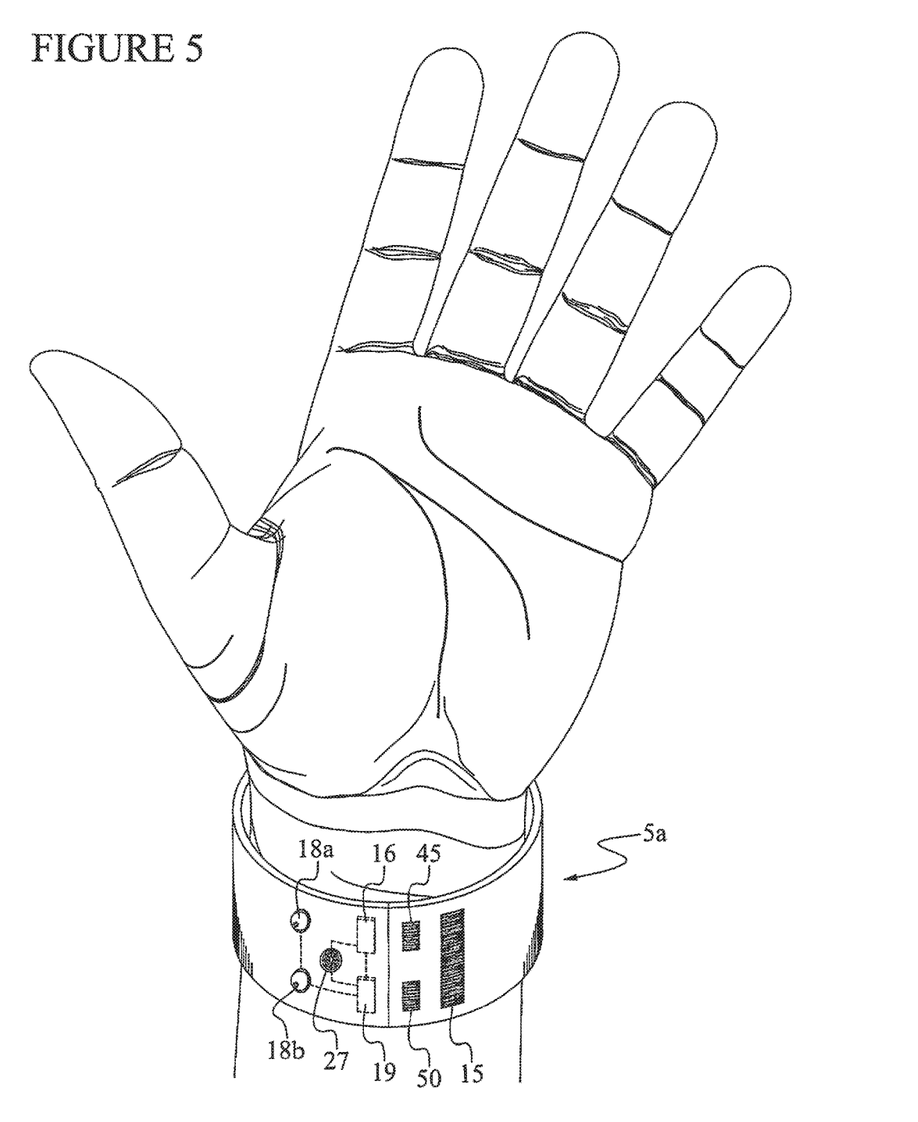
FIG. 5 shows a wristband embodiment of the wearable accessory.

FIG. 5 shows an embodiment of the ticket 5a, wherein the ticket 5a is a wristband. The wristband embodiment of the ticket 5a is further shown with first light 18a and second light 18b in communication with the controller 19 and the power source/RFID tag 16 as previously described in FIGS. 2 and 3.

While the present disclosure emphasizes the embodiments, it should be understood that within the scope of the appended claims, the disclosure might be embodied other than as specifically described herein.

What is claimed is:

1. A plurality of wearable accessories for creating a synchronously presented lighting effect from an audience in a controlled access venue for a performance, wherein each of the plurality of wearable accessories comprises:
   a. a substrate;
   b. a power source;
   c. at least one light in electrical communication with the power source;
   d. a controller comprising:
      i. a processor;
      ii. a data storage; and
      iii. computer instructions stored in the data storage for instructing the processor to operate the at least one light;
   e. a radio frequency identification tag; and
   wherein the processor of each wearable accessory operates to create a specific lighting effect for that wearable accessory so that the synchronously presented lighting effect is created within the controlled access venue during the performance by the plurality of wearable accessories allowing each audience member wearing one or more of such wearable items to inactively participate with the performance, and further wherein the processor of each wearable accessory transmits and receives information using the radio frequency identification tag to conduct a transaction.

2. The plurality of wearable accessories of claim 1, wherein each radio frequency identification tag is configured to make a payment using encryption technology.

3. The plurality of wearable accessories of claim 1, wherein each radio frequency identification tag is configured to receive a payment using encryption technology.

4. The plurality of wearable accessories of claim 1, wherein credit card information is uploaded to the radio frequency identification tag, enabling the radio frequency identification tag to act as a credit card.

5. The plurality of wearable accessories of claim 1, wherein the radio frequency identification tag holds credits usable for making a purchase or a payment.

6. The plurality of wearable accessories of claim 1, wherein payment information is available for conducting a transaction when the wearable accessory is powered on.

7. The plurality of wearable accessories of claim 6, wherein all financial information and confidential information is erased from the wearable accessory when the wearable accessory is powered off.

8. The plurality of wearable accessories of claim 1, wherein the radio frequency identification tag is used to pay for goods and services outside the controlled access venue.

9. The plurality of wearable accessories of claim 1, wherein the radio frequency identification tag stores and/or transmits information about a user of the wearable accessory.

10. The plurality of wearable accessories of claim 1, wherein the radio frequency identification tag communicates with a device which stores and/or transmits payment information or information about a user of the wearable accessory.

* * * * *